(12) United States Patent
Isherwood et al.

(10) Patent No.: US 10,387,449 B2
(45) Date of Patent: Aug. 20, 2019

(54) METADATA FAVORED REPLICATION IN ACTIVE TOPOLOGIES

(71) Applicant: Hitachi Vantara Corporation, Santa Clara, CA (US)

(72) Inventors: Benjamin Isherwood, Tewksbury, MA (US); Kevin Canuette Grimaldi, Austin, TX (US)

(73) Assignee: Hitachi Vantara Corporation, Santa Clara, CA (US)

( * ) Notice: Subject to any disclaimer, the term of this patent is extended or adjusted under 35 U.S.C. 154(b) by 431 days.

(21) Appl. No.: 15/103,892

(22) PCT Filed: May 30, 2014

(86) PCT No.: PCT/US2014/040177
§ 371 (c)(1),
(2) Date: Jun. 13, 2016

(87) PCT Pub. No.: WO2015/183301
PCT Pub. Date: Dec. 3, 2015

(65) Prior Publication Data
US 2016/0321338 A1 Nov. 3, 2016

(51) Int. Cl.
*G06F 11/20* (2006.01)
*G06F 16/00* (2019.01)
(Continued)

(52) U.S. Cl.
CPC .......... *G06F 16/27* (2019.01); *G06F 11/2094* (2013.01); *G06F 11/2097* (2013.01);
(Continued)

(58) Field of Classification Search
CPC .... G06F 8/658; G06F 11/30; G06F 17/30194; G06F 3/0614; G06F 3/0619; G06F 3/065
See application file for complete search history.

(56) References Cited

U.S. PATENT DOCUMENTS 7,814,131 B1 * 10/2010 Haynes ............... G06F 21/6218
707/790
8,112,423 B2 * 2/2012 Bernhard ................ G06F 11/08
707/610
(Continued)

FOREIGN PATENT DOCUMENTS

WO 2014/133497 A1 9/2014

OTHER PUBLICATIONS

International Search Report of PCT/US2014/040177 dated Oct. 10, 2014.
(Continued)

*Primary Examiner* — Yuk Ting Choi
(74) *Attorney, Agent, or Firm* — Mattingly & Malur, PC

(57) ABSTRACT

A method and apparatus for metadata favored replication in an active/active topology. When replicating data objects between multiple storage systems, metadata is sent first while the associated data content is sent at a subsequent time. Metadata is stored and made visible on a target storage system thereby reserving the object path in a namespace to reduce collisions in the namespace. After metadata is transferred to the target storage system, the target system performs collision processing to determine if an object already exists in the namespace prior to receiving the transferred metadata. After collision processing is performed, the winning object is made visible for access on the target storage system regardless of whether the associated data content has been transferred to the target system.

14 Claims, 10 Drawing Sheets

(51) Int. Cl.
  *G06F 16/27*  (2019.01)
  *H04L 29/08*  (2006.01)
(52) U.S. Cl.
  CPC .......... *G06F 16/00* (2019.01); *H04L 67/1095* (2013.01); *H04L 67/1097* (2013.01); *H04L 67/28* (2013.01)

(56) References Cited

U.S. PATENT DOCUMENTS

| | | | |
|---|---|---|---|
| 9,529,812 B1* | 12/2016 | James | G06F 16/148 707/999.003 |
| 2006/0026219 A1 | 2/2006 | Orenstein et al. | |
| 2009/0113241 A1* | 4/2009 | van Ingen | G06F 11/0715 714/21 |
| 2012/0079315 A1* | 3/2012 | Isherwood | G06F 11/2089 714/6.2 |
| 2013/0036088 A1* | 2/2013 | Orenstein | G06F 17/30 707/610 |
| 2014/0006465 A1 | 1/2014 | Davis et al. | |
| 2014/0108346 A1 | 4/2014 | Pinkney et al. | |
| 2015/0169225 A1* | 6/2015 | Curley | G06F 3/0619 711/162 |
| 2017/0075921 A1* | 3/2017 | Benton | G06F 17/30174 707/610 |

OTHER PUBLICATIONS

Extended European Search Report received in corresponding European Application No. 14893185.0 dated Dec. 22, 2017.

* cited by examiner

METADATA FAVORED REPLICATION IN ACTIVE TOPOLOGIES

BACKGROUND OF THE INVENTION

1. Technical Field

The present invention relates generally to techniques for highly available, reliable, and persistent data storage in a distributed computer network.

2. Description of the Related Art

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. In storage systems including a Redundant Array of Independent Nodes (RAIN), a storage approach has emerged as the architecture of choice for creating large online archives for the storage of such fixed content information assets. By replicating data on multiple storage systems, which include multiple nodes, the storage system archives can automatically compensate for node failure or removal. Typically, RAIN systems are largely delivered as hardware appliances designed from identical components within a closed system. The closed system may involve one or more storage systems connected over a network. To replicate data on multiple storage systems, systems of the prior art the archive system would send the entirety of the data (object) payload, including the data content and associated metadata, to the other storage systems for replication. However, sometimes collisions between a replicated object and another object on the replication target storage system may occur.

A method of recovery of a primary cluster is also known in which a replica cluster sends metadata of an object to be recovered to the primary cluster and the primary cluster starts to receive access from a client of the primary cluster for the data associated with the metadata. In this method, the primary system to be recovered receives metadata first, which then allows a client to access the data even though the content data associated with the metadata has yet to be transferred to the primary cluster using a read from replica process. This method is described in U.S. Pat. No. 8,112,423, which is incorporated herein by reference

BRIEF SUMMARY OF THE INVENTION

1. Problem to be Solved

In a replicated storage system including storage systems at different locations where updates to namespace content may occur on multiple systems in the topology, the latency of metadata update propagation needs to be minimized to reduce the occurrence of data conflicts across those storage systems. Before data is replicated from a source storage system to a target storage system, an object having the same object path (name) may have been created in the target storage system. When the source system sends the data to be replicated in the target storage system, a collision occurs between the incoming data and the existing data in the target storage system when it is determined that the incoming data and the existing data are not consistent. An object of the method and apparatus is to reduce the occurrence of data conflicts across storage systems by sending metadata independently of the associated data content to the target storage system to effectively reserve the object path in the target system, which reduces conflicts.

2. Summary

A method for reducing conflicts on storage systems in a topology where updates to namespaces shared across multiple storage systems may occur. Storage systems include clusters of nodes where each individual archive is a storage cluster of preferably symmetric nodes. Each node of a cluster of a storage system typically executes an instance of an application that provides object-based storage of fixed content data and associated metadata. In an active/active topology, a client application on one system may write an object (e.g. "/object1") to the same namespace as another client who also wrote "/object1." To reduce the rate of conflicting concurrent updates on systems in an active/active replication topology across object stores, a separate process is used to synchronize metadata before the data is synchronized across the storage systems having the same namespace. When there is a large backlog of data to be replicated, this significantly reduces the delay between when an update is made on one object store and when it becomes visible to clients of other object stores in the replication topology. A much shorter backlog of data to be replicated can be maintained because object metadata is generally significantly smaller than object data. As data is updated (e.g., written) on one system, the metadata associated with the data is sent to one or more storage systems in the topology that also maintain the same namespace. The metadata on the other systems is then used to gauge whether incoming data on the target system that received the metadata will conflict with any other data on the target system.

In replication topologies where one or more systems only store object metadata, this mechanism can remove the need for transmitting the associated data content at all.

In systems that support transparently reading data from other systems in the replication topology when it is not locally available (read from replica), this also reduces the length of time before an object becomes accessible for reading throughout the replication topology.

The foregoing has outlined some of the more pertinent features of the invention, which may exist in multiple embodiments. These features should be construed to be merely illustrative. Many other beneficial results can be attained by applying the disclosed invention in a different manner or by modifying the invention as will be described.

DETAILED DESCRIPTION OF THE INVENTION

Figure 1:
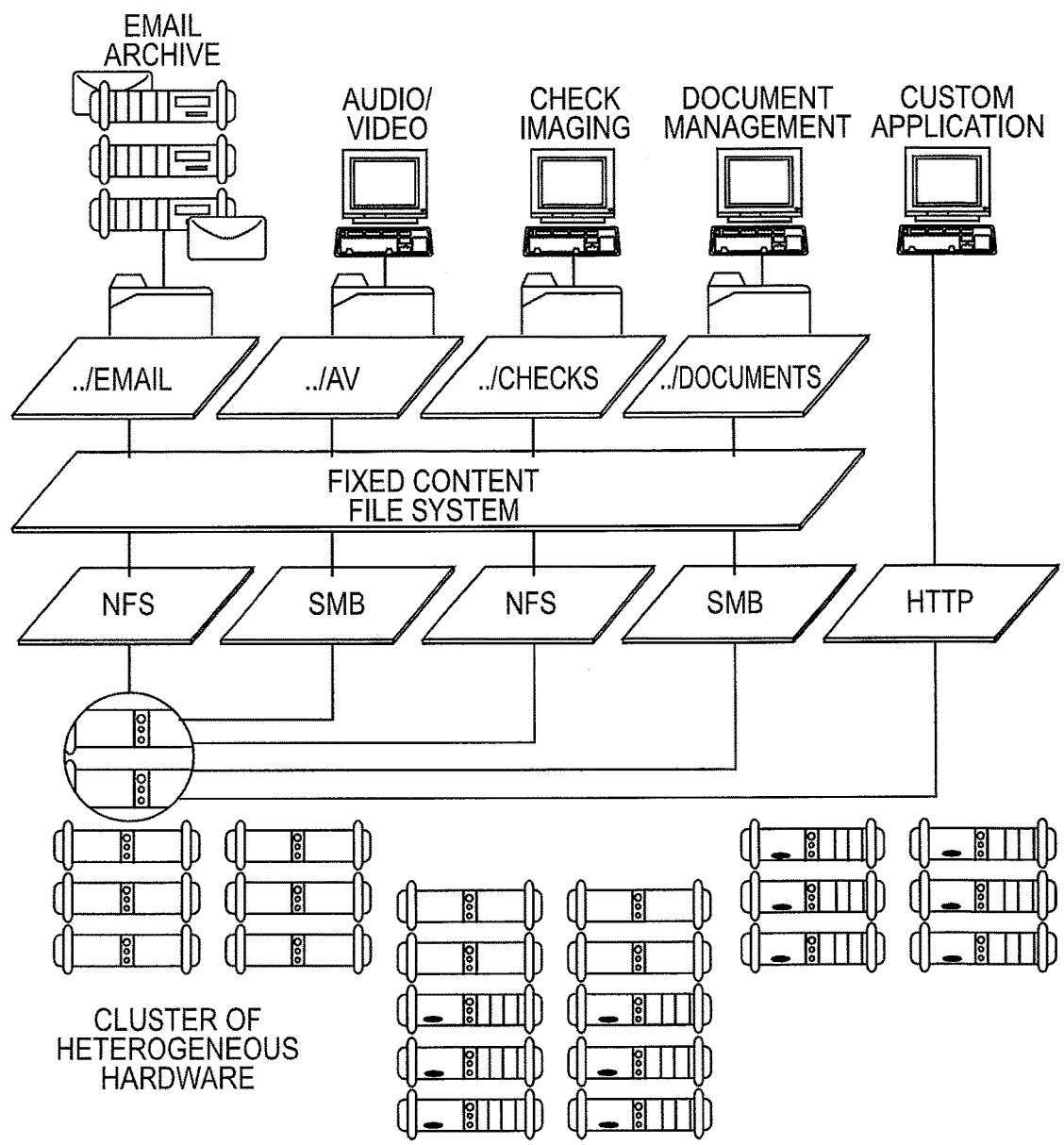
FIG. 1 is a simplified block diagram of a fixed content storage archive in an embodiment in which the method and apparatus of the invention may be applied.

In the following detailed description, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "an embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for a replicated object storage system to which embodiments of the present invention apply. In an archived storage system of object-based storage of fixed content data and associated metadata, the objects are replicated and stored across multiple storage systems, which may exist at different geographical locations. The storage systems are connected over networks and use links (e.g., replication links, which will be described later), which are configured associations between two or more storage systems. The storage systems include a one or more clusters and each cluster stores content data and the metadata associated with the content data. The storage systems are in an active/active replication topology across object stores. The following describes a storage system architecture in the context of storage clusters of preferably symmetric nodes.

It is known to provide a scalable disk-based archival storage management system, preferably a system architecture based on a redundant array of independent nodes. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. In one illustrative embodiment, the software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes, which are part of a storage system. Preferably, each node is symmetric with its peers. Thus, because preferably any given node can perform all functions, the failure of any one node has little impact on the archive's availability.

Figure 2:
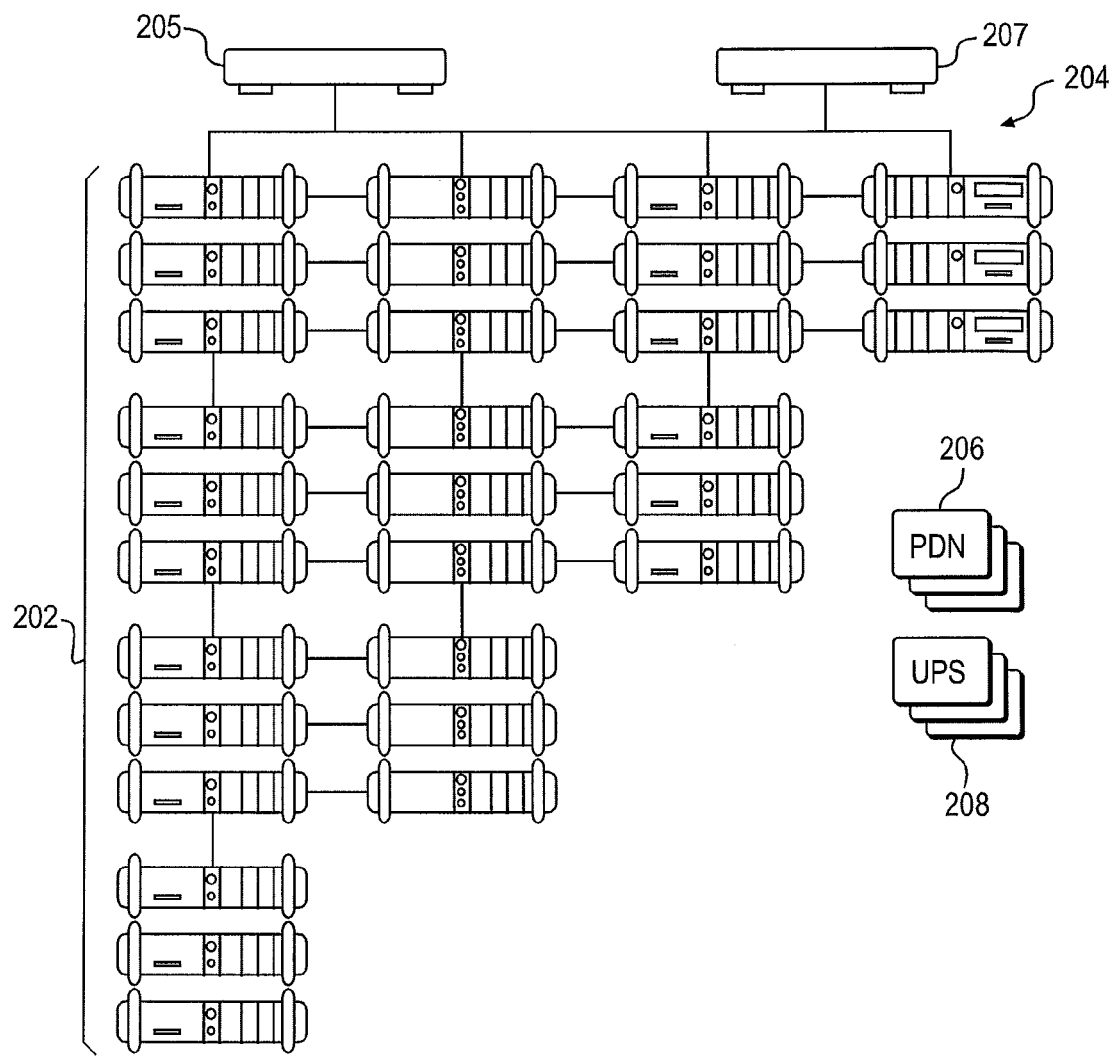
FIG. 2 is a simplified representation of a redundant array of independent nodes each of which is symmetric and supports an archive cluster application according to an embodiment of the present invention.

As described in U.S. Pat. No. 7,155,466, which is incorporated herein by reference, a distributed software application executed on each node captures, preserves, manages, and retrieves digital assets. In an illustrated embodiment of FIG. 2, a physical boundary of an individual archive is referred to as a cluster. Typically, a cluster is not a single device, but rather a collection of devices. Devices may be homogeneous or heterogeneous. A typical device is a computer or machine running an operating system such as Red Hat Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements. Preferably, data is replicated across the cluster so that the archive is always protected from device failure. If a disk or node fails, the cluster automatically fails over to other nodes in the cluster that maintain replicas of the same data.

An illustrative cluster preferably comprises the following general categories of components: nodes 202, a pair of network switches 204, power distribution units (PDUs) 206, and uninterruptible power supplies (UPSs) 208. In some embodiments, a node 202 comprises one or more commodity servers and contains a CPU (e.g., Intel x86, suitable random access memory (RAM), one or more hard drives (e.g., standard IDE/SATA, SCSI, SATA II or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to, via the storage system, a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program or tool. Access to a storage system may be carried out over any IP-based protocol (HTTP, FTP, NFS, AFS, SMB, a Web service, or the like), via an API, or through any other known or later-developed access method, service, program or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include: NFS, FTP, SMB/CIFS, or the like. When in object is made visible, in an embodiment of the present invention it means the object is made visible to the gateways and therefore the application (i.e., client) of the storage system. In addition, in one embodiment, the system metadata includes a state indicating whether the object is visible. When an object is made visible by the storage system, the state may change to indicate that it is visible.

In one embodiment, the archive cluster application runs on a redundant array of independent nodes (H-RAIN) that are networked together (e.g., via Ethernet) as a cluster. The hardware of given nodes may be heterogeneous. For reliability, however, preferably each node runs an instance 300 of the distributed application (which may be the same instance, or substantially the same instance), which is comprised of several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. A replication service layer is a software component included in the software stack on the nodes and is therefore included across all storage systems. A replication service layer is run and controlled by a replication manager, which is described below. The replication manager is the component that runs the replication service software. The replication service software is a coordinator for the collision handling process, including batching and sending batched metadata. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to an embodiment of the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The internal file may be referred to as data content in the following description. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. This operation is described in more detail below. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse local directly structures.

Figure 3:
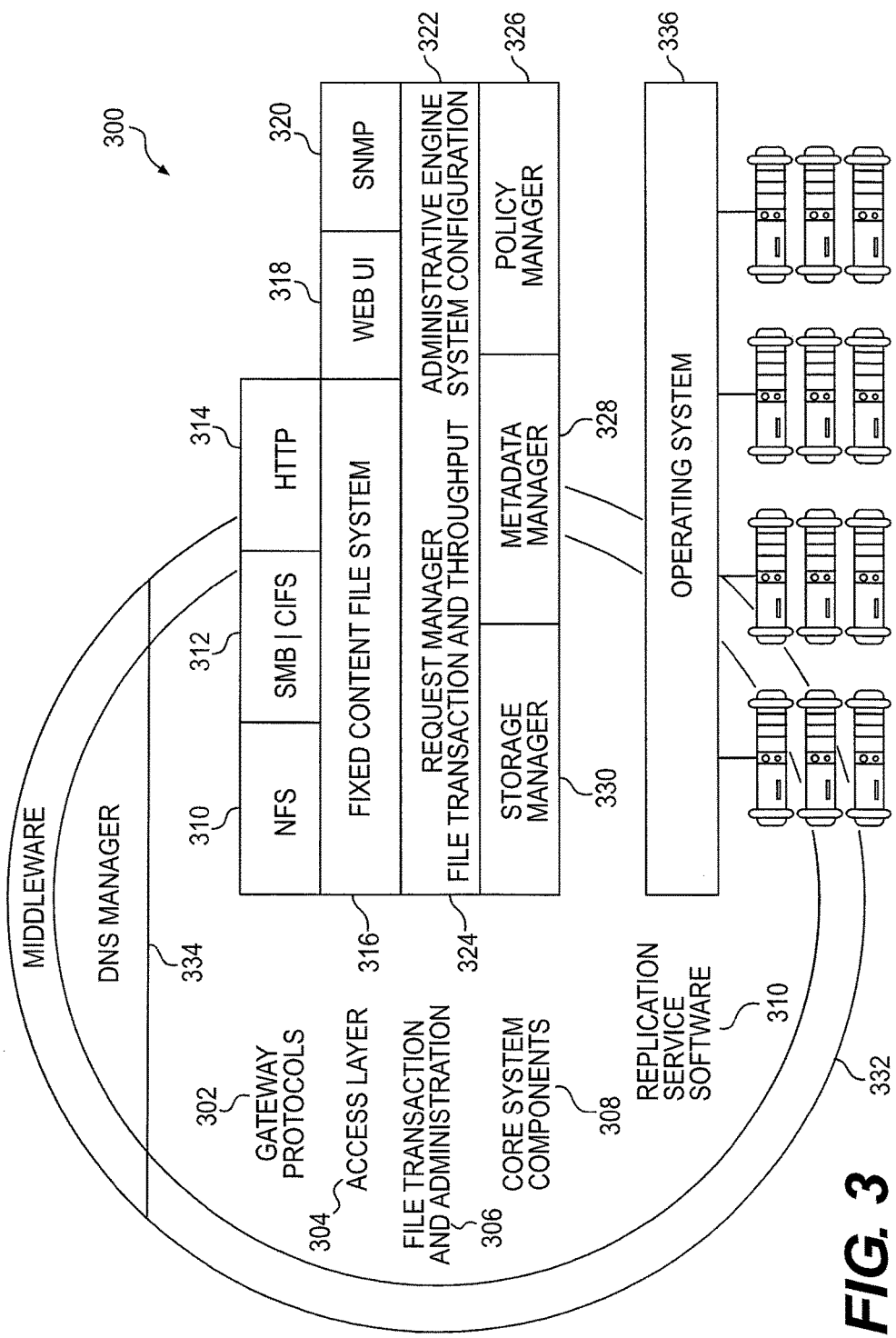
FIG. 3 is a high level representation of the various components of the archive cluster application executing on a given node in an embodiment of the present invention.

As illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the application instance executes on a base operating system 336, such as Red Hat Linux. The communications middleware is any convenient distributed communication mechanism. Other components may include FUSE (Filesystem in USErspace), which may be used for the Fixed Content File System (FCFS) 316. The NFS gateway 310 may be implemented by Unfsd, which is a user space implementation of the standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices which may either be included internally with the hardware of each node or provided externally to each node. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file it generates a full path and file name for the representation for which it will be responsible. In a representative embodiment, each object to be stored on a storage manager is received as raw data to be stored, with the storage manager then adding its own metadata to the file as it stores it to keep track of different types of information.

In general, objects of the object storage systems each include custom metadata, system metadata, and fixed data content. System metadata is changed by the system and typically includes, but is not limited to path of the object (pathname), hash value of data, version ID, change time, retention, DPL, collision flag indication, and whether custom metadata exists. By way of example, this metadata may also include: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), EF Filename (external file filename), a pointer to the location of the data contents in the cluster, and a state indicating whether the object is visible to the application (client). Custom metadata is changed by the client of the application. In one example, a client may add notes to a patient's records. The note is stored in custom metadata. A version ID is a time-based version identifier that uniquely identifies the version of the object in the archive and is enabled or disabled in the namespace configuration. Storing this additional metadata with the internal file data provides for additional levels of protection. In particular, scavenging can create external file records in the database from the metadata stored in the internal files. Other policies can validate internal file hash against the internal file to validate that the internal file remains intact.

As noted above, internal files preferably are the "chunks" of data representing a portion of the original "file" in the archive object, and preferably they are placed on different nodes to achieve striping and protection blocks. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager also ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. The above is a description of a known archive cluster. The cluster is part of a storage system. Multiple storage systems in an active/active replication topology may be configured in an archive system. The above also applies to storage systems in an active/active replication topology.

Storage systems of embodiments of the present invention may be configured according to FIGS. 4(a), (b), and (c). Although, the configurations described are not a limitation or requirement. Each of the storage system configurations described with respect to FIGS. 4(a), (b), and (c) implement some or all of the features described above with respect to the node hardware configurations, software, processes and the like (i.e., shown and described with respect to FIGS. 1, 2, and 3).

One configuration of a storage system (e.g., HCP300) of an embodiment of the present invention is comprised of a plurality of nodes 250 that may be grouped into clusters. In this configuration, each node 250 includes a CPU 254, memory (RAM) 256, and an internal storage device 258 (e.g., hard disk drive (HDD), standard IDE/SATA, SCSI, SATA II or the like) for storing data objects. Each storage device 258 of each node 250 is provided to an application by the node 250 and each storage device 258 stores data content and associated metadata of the storage system. The internal storage device 258 has one or more namespaces configured therein. As shown in FIG. 4(a), and mentioned above, each node 250 is connectable to a network 252, such as the public Internet, an enterprise intranet, or other wide area or local area network. Additionally, the nodes 250 are enabled to have peer-to-peer communication therebetween.

In another storage system configuration of an embodiment of the present invention (e.g., HCP 500) shown in FIG. 4(b), a plurality of nodes 250 are connected to a storage area network (SAN), which includes a plurality of storage devices 266. Similar to the above configuration, each node 250 includes a CPU 254, memory 256, however, the nodes 252 do not include an internal storage device. Rather the nodes 250 according to the configuration of FIG. 4(b) are connected to a SAN 260 and the nodes 250 boot from the SAN-attached storage devices 266. Each external storage device 266 includes a controller 262 and one or more storage drives 264. The SAN 260 may be virtualized, by the controller 262, presenting logical disks to the client application.

The storage devices 266 include a plurality of storage drives 264, which store data content and associated metadata of the storage system. Each storage drive 264 is, for example, a hard disk drive (HDD), semiconductor storage device (SDD) or the like of a type such as SAS (serial attached storage), SATA (Serial ATA), SATA II, FC (Fibre Channel), PATA (Parallel ATA), and SCSI. In some embodiments, the storage device 266 provides the application with a storage area of the storage device 266 in units of logical storage areas provided by controlling the storage drives 264, with the controller 262, in accordance with a method such as, for example, a RAID (Redundant Arrays of Inexpensive (or Independent) Disks) or the like. Further, as shown in FIG. 4(b), each node 250 is connectable to a network 260, such as the public Internet, an enterprise intranet, or other wide area or local area network. Additionally, the nodes 250 are enabled to have peer-to-peer communication therebetween.

In yet another storage system configuration of an embodiment of the present invention (e.g., HCP500-x) shown in FIG. 4(c), a plurality of nodes 250 are connected to a SAN 260, which includes a plurality of storage devices 266, similar to the configuration of FIG. 4(b). According to this storage system, each node 250 includes an internal storage device 258 (HDD, SATA, SATA II, and the like), which stores metadata only of the data content of the storage system. In addition, each node 250 includes a CPU 254 and memory 256. The nodes 250 are attached to the SAN 260 and the external storage devices 266.

The storage devices 266 include a plurality of storage drives 264, which store data content of the storage system. Each storage drive 264 is, for example, a hard disk drive (HDD), semiconductor storage device (SDD) or the like of a type such as SAS (serial attached storage), SATA (Serial ATA), SATA II, FC (Fibre Channel), PATA (Parallel ATA), and SCSI. The storage device 266 provides the application with a storage area of the storage device 266 in units of logical storage areas provided by controlling the storage drives 264, with the controller 262, in accordance with a method such as, for example, a RAID (Redundant Arrays of Inexpensive (or Independent) Disks) or the like. Further, as shown in FIG. 4(c), each node 250 is connectable to a network 252, such as the public Internet, an enterprise intranet, or other wide area or local area network. Additionally, the nodes 252 are enabled to have peer-to-peer communication therebetween.

As implemented in an embodiment of the present invention, one storage system may be comprised of the configuration shown and described with reference to FIG. 4(a) and another storage system may be comprised of the configuration as shown and described with reference to FIG. 4(b), but each is connected via network(s) and part of the same overall storage system. Combinations of multiple different types of storage system configurations (e.g., the configurations shown and described in FIGS. 4(a)-(c)) may be present. In addition, storage systems may be located in different geographic locations, although this is not a limitation or requirement.

Figure 4:
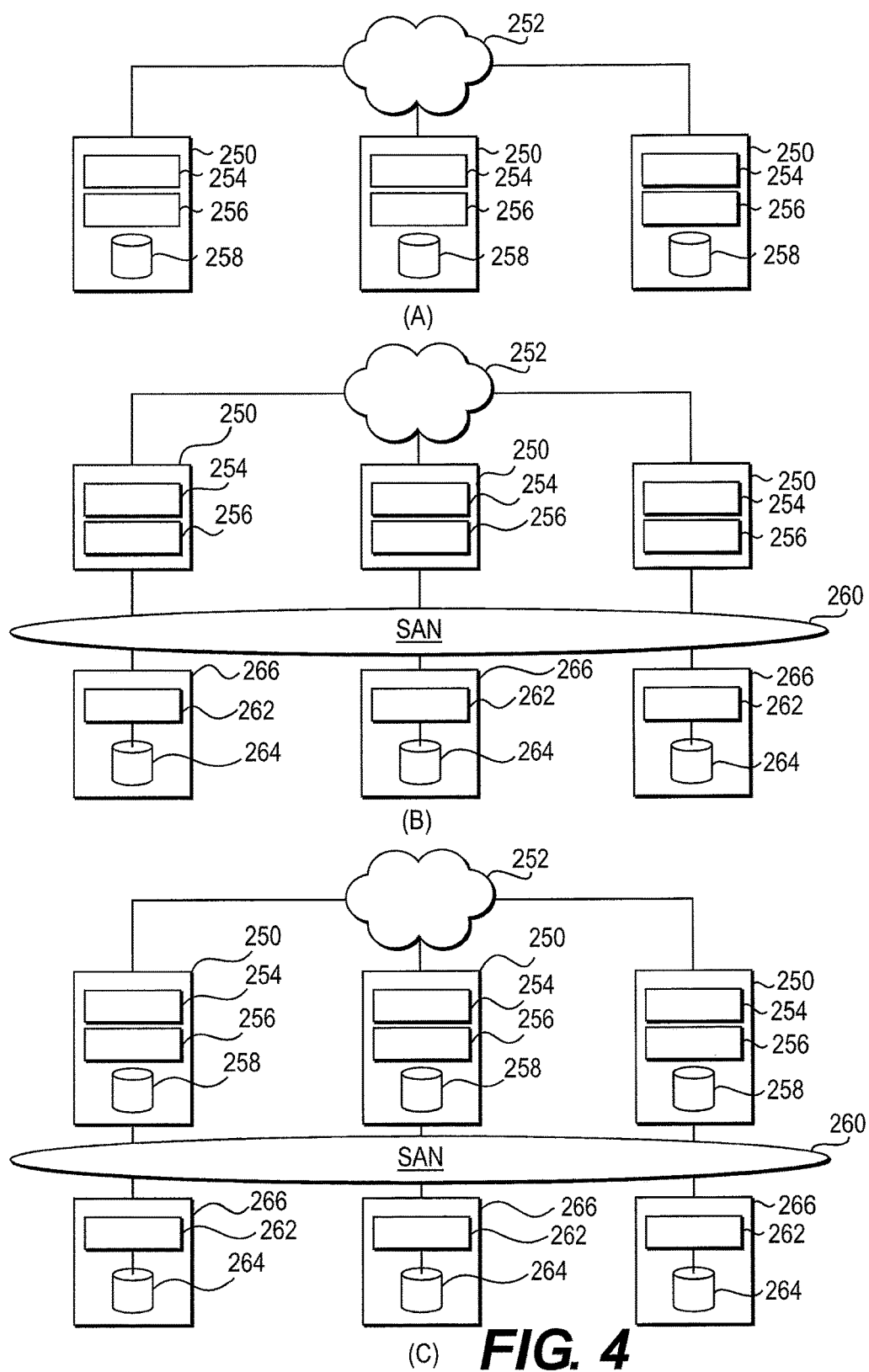
FIG. 4(a) is an exemplary configuration of a storage system according to an embodiment of the present invention.
FIG. 4(b) is another exemplary configuration of a storage system according to an embodiment of the present invention.
FIG. 4(c) is yet another exemplary configuration of a storage system according to an embodiment of the present invention.

Of course, the system configurations illustrated in FIGS. 1 and 4 are purely exemplary embodiments of the replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

The following terminology applies to embodiments of the present invention.

Replication: a process that efficiently copies data from a primary cluster to a replica cluster. A primary cluster and a replica cluster may exist on different storage systems.

Namespace (NS): a logical container for a set of files and directories. A namespace provides context for the objects it holds and allows disambiguation of items having the same name (residing in different namespaces). Preferably, it provides a complete filesystem tree. This allows files with identical names to coexist on the same cluster (or storage system) as long as they are in different namespaces. A cluster can provide a namespace as either authoritative (writable by external clients) or backup (read-only by external clients). A cluster can simultaneously host multiple Namespaces in different roles. A namespace may exist on multiple storage systems. A namespace may be initiated on one storage system by another storage system using a replication link. In the active/active object storage system of the present invention, a namespace may be generated such that the same namespace and it's object contents are accessible for both object read and write operations at multiple storage system sites in the replication topology.

Link: a configured association between two clusters for the purpose of replication. A link describes how a set of data will be replicated from source to target. In one embodiment, the smallest "set of data" is a namespace. A link's configuration typically includes a source cluster DNS name, a target cluster DNS name, a replication schedule, transport configuration, the namespace to be replicated, and authentication information.

A link may be referred to as a "replication link." A replication link is a configured connection that transports data and replication control commands between primary and secondary sites. A replication link describes how a set of data will be replicated from a source storage system to a target storage system. A replication link enables a source namespace to be replicated to a specified storage system. A replication link's configuration may include information directing the target system to add a tenant and a namespace on the target system. The replication link configuration also includes the transport and security configuration. Initially, a global data transfer is conducted between storage systems to ensure replication. Once a namespace and tenant (that also exists on the source system) is established on a target system, the target system sends an acknowledgement to the target system indicating that the namespace and tenant are set and global data is transferred. A system tenant and namespace must first be sent from the source system to a target system and acknowledged before metadata is sent from the source storage system. In other words, the source storage system waits for an acknowledgement that the tenant and namespace are configured before transferring data during the global data transfer. The metadata and data during the global transfer are sent in batches.

Change log: an ordered list of changes for a given source-cluster region and time range. Within a change log, each object may have many changes. The change log indicates changes to objects in separate change time windows, one for metadata, one for data content, which is described in more detail below.

Service plan: a collection of settings for a storage system that determine policies for storing data. For example, a setting in the service plan may dictate that the storage system stores metadata only for an object. The service plan may dictate that the storage system stores both the metadata and the associated data content. In yet another example, the service plan sets the retention time for objects. For example, certain objects in the store may have a retention period of 15 years, while others may have a retention period of 20 years. In certain steps of the processes described below the service plan of a target storage system is evaluated to determine what instructions, if any, are included in an acknowledgment message to be sent to a source system. For example, if the service plan indicates that the storage system stores the associated data content for an object, then that storage system will include in its instructions to send a replica of the associated data content.

A replication manager provides a top level parent of other replication components. Its job is to be a coordinator for the whole replication process as well as repository for configuration and replication state knowledge. As mentioned above, the replication manager runs the replication service software, which controls, in part, the operations, and processes performed by the storage system for the apparatus and method of the embodiments of the present invention. The control flow for the replication manager is as follows. After startup, the replication manager loads a configuration. For each replication link, the replication manager then cycles through the following algorithm: create replication link object; register for scheduler events; create copy object; determine if the link is a namespace master and, if so, call a copy.startSending function( ) otherwise (i.e., if the link is not a namespace master), call a copy.startReceiving function ( ) The replication manager responds to any scheduler/priority changes by calling a function copy.setPriority ( ) on the appropriate link. The replication manager responds to any shutdown needs by calling a function copy.shutdown ( ) on all links.

The replication manager is responsible for all top level control of the copy process. Preferably, both ends of the replication link run through the same algorithm. No cross-cluster control communication is required in this process, as both ends just start and stop based on their schedules. Only when a link is paused on one end is a message sent to the replication manager on the other end to pause processing.

Preferably, the replication manager is started by the administrative engine (see FIG. 3). As noted above, it loads replication configuration and builds the set of one or more replication links with this configuration. Preferably, the replication manager registers with a scheduler to receive notifications for all start, stop and priority change notifications, and it uses this information in its role as coordinator to notify the links that need to change behavior. When the scheduler starts/stops tasks the replication manager coordinates the replication worker threads associated with this link. This includes a change log collection component for each link. Once the links are scheduled, the replication manager handles "start" events arriving from the scheduler and dispatches the appropriate link. As noted above, when the link receives a start message is creates a copy object and calls startSending or startReceiving on the copy object depending on the state of the namespace (authoritative or backup). As priority changes come in from the scheduler, the replication manager informs the appropriate links about the state change via setPriority. The copy process adjusts to the change in priority at a convenient time. When it is time to shutdown, the replication manager informs the links. They will, in turn, call shutdown no the copy processes, which will immediately terminate the copy process.

When an association between two storage systems is needed for the purpose of replication, a replication link needs to be created. Replication link creation, modification, management, and deletion is described in U.S. Pat. No. 8,112,423 with respect to primary clusters and replica clusters. The same processes and techniques are used with respect to replication between storage systems.

The "read from replica" system enables the content platform to serve the read requests from replica in a cluster/system containing a replica of the object when the system cannot read the object from the local system. A read from replica process is performed by one system to access a replica of the object from a second system among the plurality of systems and uses the replica of the object to return the object of the read request to the client application. The read from replica algorithm is explained in detail in U.S. Pat. No. 8,621,270, which is incorporated by reference herein. A description of the algorithm follows. In the following general description of the read from replica algorithm, system B is the target storage system that received metadata for an object to be replicated from system A, a source storage system. System B receives a read request from a client application. System B looks up metadata of the read request in the Metadata Manager (MM). If the metadata corresponding to the read request is found in the MM and the metadata is healthy, then the read process proceeds. If the metadata is not found in the MM, then then system A sends a failure notice to the client application.

System B looks up the data to be read pursuant to the read request in the Storage Manager (SM). A read from replica is performed by system B using the metadata of the object to be read (which is stored on system B). The data content associated with the metadata of the object is stored on system A. However, to the client application, the object is fully visible on system B and therefore accessible by the client of system B. In this situation, the replica is the object stored on system A and at this point system B only has the metadata of the object stored. Accordingly, system B accesses the metadata and reads the data content of the object from system A and returns the read data to the client application of system B.

Versioning is described in U.S. Pat. No. 8,566,290, which is incorporated by reference herein. If versioning is enabled, collisions between incoming objects and existing objects do not occur. If versioning is enabled for a particular namespace and during replication metadata is transferred to a target storage system that has the same object path as an existing object, a new version for the data path is created and stored. Likewise, if versioning is enabled for a particular namespace and a data write comes in that has the same object path as an existing object, a new version for the data path is created and stored. There is no conflict for the object path and the data is always inserted. In other words, if versioning is enabled there will never be a conflict between an existing data object and an incoming data object on a storage system. The incoming data object will always be entered as a different version of the same object according to the versioning configuration of the namespace.

To reduce the rate of conflicting concurrent updates on systems in an active/active replication topology across object stores (system A and system B), a separate process is used to synchronize metadata before data. When objects are created by clients on one system, they are synchronized to the other systems in the topology through an asynchronous replication service. When a client writes an object to one of two storage systems in an active/active topology, each storage system transfers the metadata (before sending the file data) separately to other storage systems by batch process. This metadata includes the object system metadata parts (file path, version, create time, etc.) and any annotations (e.g., custom metadata). At a later point in time, the data is transferred by batch process and the complete object becomes protected at multiple sites. Once the other storage systems receive the metadata portion of the objects, the objects are then made fully visible to clients on those systems. Because the objects are visible, clients on a remote system may view and access these objects, even though only the metadata portion of those objects exists on the local system. Client attempts to read the data content of these objects will be immediately serviced using the "read from replica" system. As discussed above in the read from replica system, data is streamed from a remote system (which contains both data and metadata) back through the local system (where only metadata exists) to the client requesting the data. The metadata manager 328 also contains a state indicating whether the object is visible to gateways, or not. All objects that are stored in the metadata manager database in metadata only mode (according to the service plan) are marked as visible, allowing the objects to be read by an application.

Utilizing the above software components and mechanisms of the storage systems (e.g., replication manager, replication service software, metadata manager, replication links) the processing used to synchronize metadata before the associated content data is synchronized to reduce the rate of conflicting concurrent updates on systems in an active/active replication topology across object stores, is performed, as described below. As mentioned above, the method and apparatus involves multiple storage systems connected over a network and through replication links. For clarity purposes, however, the method and apparatus of the present invention are described with respect to two storage systems, system A and system B.

In an active/active topology, a client application on one system may write an object (e.g. "/object1") to the same namespace as another client who also wrote "/object1." When these objects synchronize over a replication link, it is not clear which object content should be stored as "/object1" on each system. This scenario is known as an object "collision". The batched transfer of metadata according to the present invention helps to eliminate the possibility of these collisions by "reserving" the object name on system B as efficiently as possible. Client attempts to generate "/object1" on system B where the metadata for "/object1" already exists will receive an error instead of a successful write, preventing the collision from ever occurring.

Figure 5:
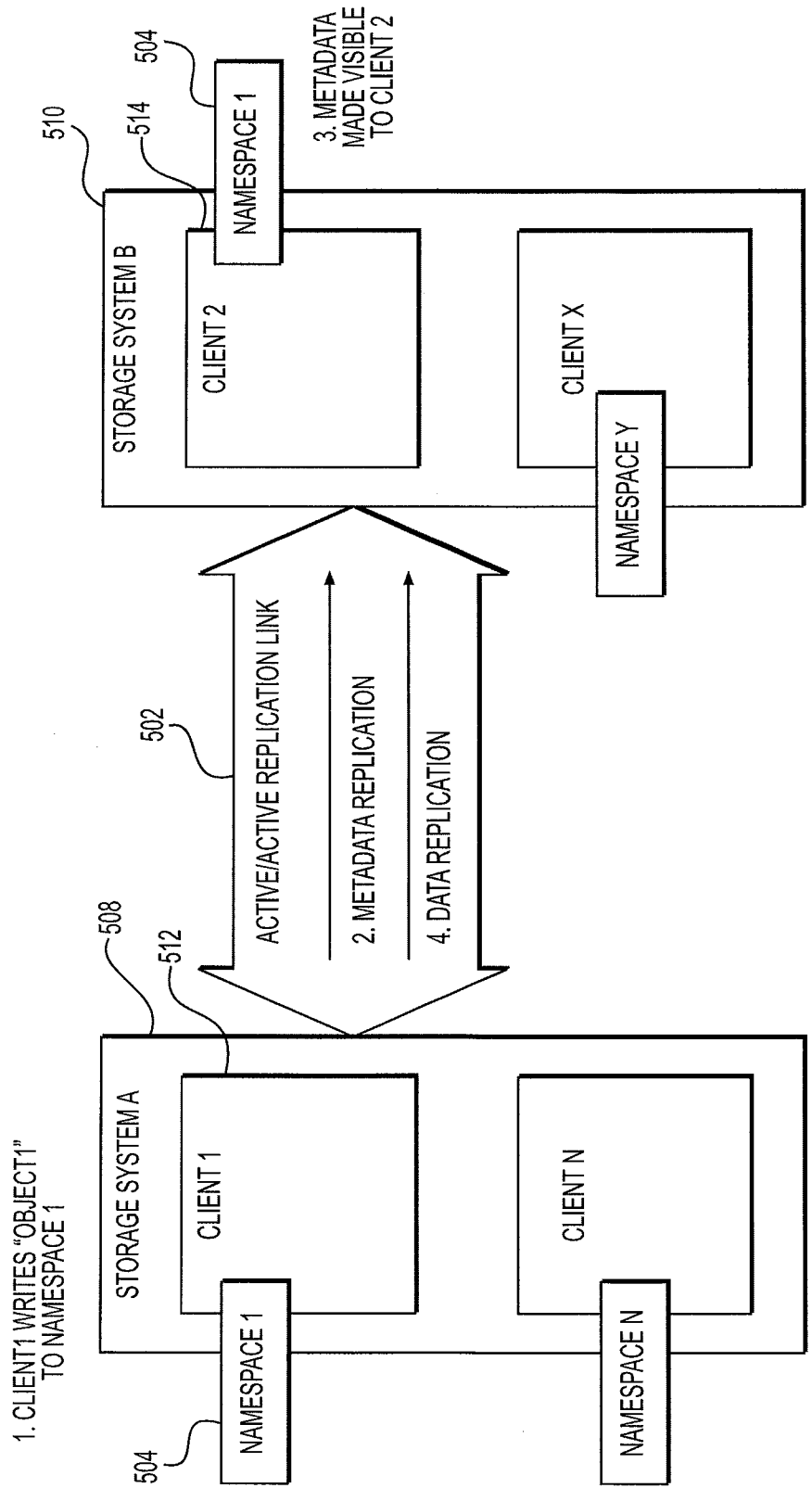
FIG. 5 is diagram illustrating the general processing between two storage systems according to an embodiment of the present invention.

FIG. 5 shows general processing of synchronizing metadata before synchronizing the associated data content between two storage systems (storage system A and storage system B) to reduce collisions. Storage systems A and B are connected using an active/active replication link. Namespace 1 is configured and replicated on both storage systems. In this case, storage system A receives a write request from client 1 to write an object, which is given the object path "/object1." After the object is committed to disk on system A, the metadata for/object1 is transferred over the replication link to system B. System B receives the metadata and makes/object1 visible to client 2. However, before system B makes/object1 visible to client 2 using solely the metadata, system B performs collision processing. Thereafter, the data associated with the metadata of/object1 is transferred to system B (if necessary according to the service plan of system B).

Storage systems A and B may be configured as depicted and described with respect to FIGS. 4(*a*), (*b*), and (*c*), although this is not a limitation. Storage system A may have multiple namespaces residing thereon and may serve multiple clients or applications. Illustrated in FIG. 5 is an exemplary situation in which client 1 is writing /object1 to namespace 1 and client n is able to access a namespace referred to as namespace n. The active/active replication link exists via network(s) between system A and system B. System B also has namespace 1 residing thereon and the data objects stored within namespace 1 on system A are replicated in namespace 1 on system B. Namespace 1 on system B serves client 2, although it may also serve multiple clients and have multiple namespaces, same as system A. For example, as illustrated in FIG. 5, system B also has a namespace referred to as namespace y, which client x is able to access.

On each storage system, the metadata manager manages a log of changes to objects. When a client writes an object to a storage system, the write is logged and the log is represented as a change time window. The change time window is a window of time, which indicates changes to all objects. The width of the time frame of the window is determined by checkpoint time intervals, which is 20 seconds, for example. The replication service manages the checkpoints ensuring that a new one begins where the previous checkpoint left off. There is a separate change time window for metadata and a separate change time window for the data associated with the metadata. In particular, one background process managed by the replication service collects the metadata changes in the change time window for objects while another background process managed by the replication service collects the associated data changes in the change time window for the objects. These two processes (collection systems) are responsible for batching the metadata and data, respectively.

Accordingly, the system looks to the change time window for metadata to batch. During the batch building process, only after a metadata batch is built successfully is the data batch built. The data batch is not built by the replication service until storage system A receives an acknowledgment from storage system B that system B successfully received the metadata batch. In addition, time change windows are not stored for long periods of time once they are batched successfully, they are written over in time, although this is not a limitation or requirement. The metadata manager stores checkpoints for the replication service and queries change time windows for metadata and data changes.

As mentioned above, when a client writes an object to system A, the object is given a name and a path (e.g., "/object1") and is stored in a namespace. The metadata manager constructs and manages the system metadata. The change to the object is noted in the change time window. In addition, the metadata associated with the object includes a change time, as mentioned above.

Figure 6:
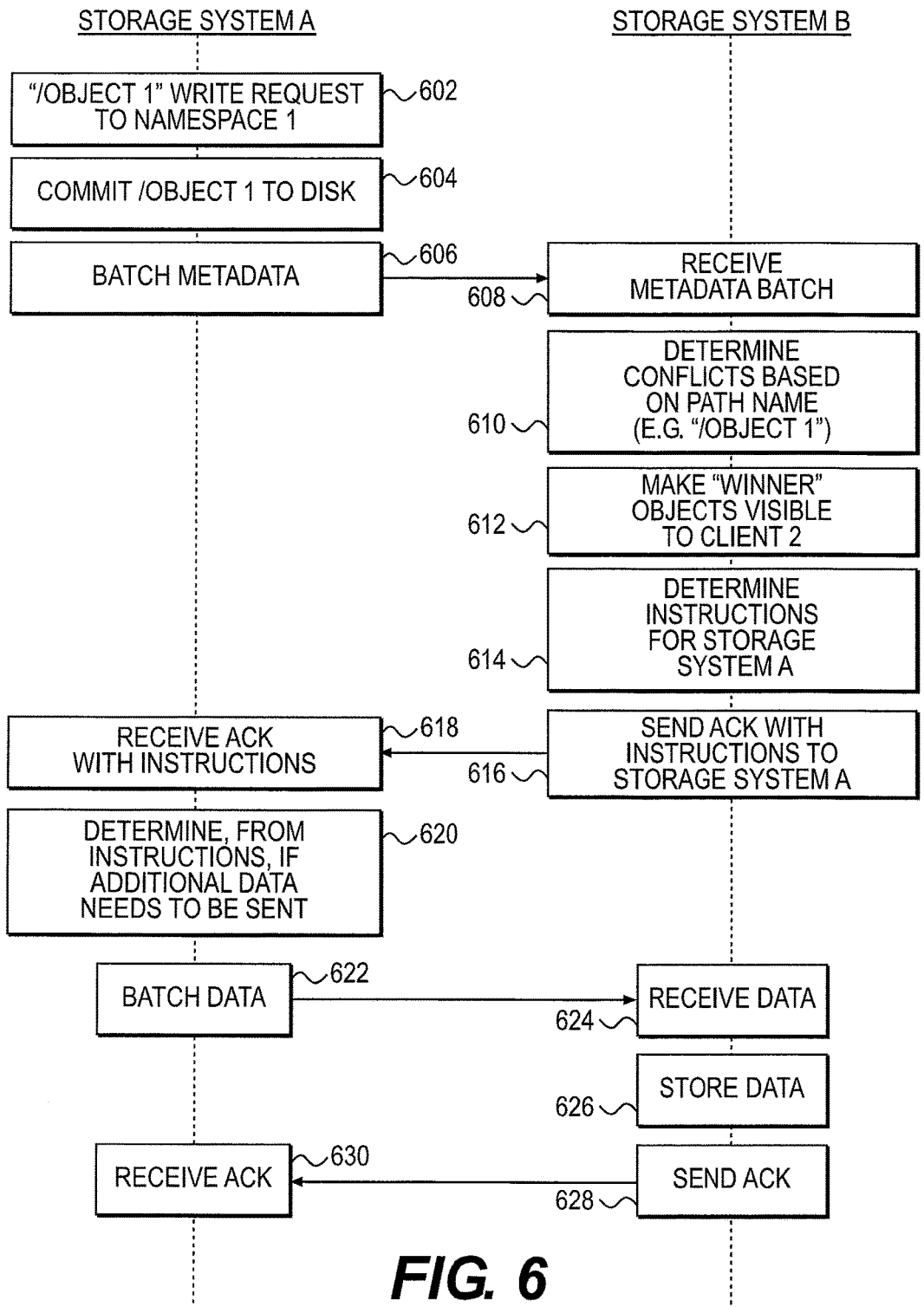
FIG. 6 is a flowchart generally illustrating the processing between a source storage system (A) and a target storage system (B) of an embodiment of the present invention.

FIG. 6 is a flowchart illustrating the general processing between storage system A and storage system B of synchronizing metadata first to "reserve" the object on storage system B to minimize conflicts. In the following description of the flowchart of FIG. 6, system A receives a write request from client 1 to write an object to namespace 1 (step 602). The object, for purposes of explanation, is given the path name "/object1", denoting that the object is identified in namespace1 as /object1. Namespace 1 is an exemplary namespace on system A which has been previously replicated on system B. When system A receives a write request, the system commits the write to disk thereby storing the object locally (step 604) to a storage drive. The metadata is created for/object1 and stored in the database by the metadata manager. In addition, the write is noted in the change time window by the metadata manager.

At step 606, the replication service uses the metadata manager to query the metadata change time window to identify changes in metadata for any objects it stores. The replication service then builds a batch of any object's metadata that has changed within the change time window using a background collection process. In this case the batch includes/object1's metadata. The batch is sent to system B using the previously established replication link. At step 608, system B receives the metadata batch. For each object's metadata in the batch, system B determines whether there are any conflicts in namespace 1 between objects stored in its database (existing objects) and objects that have their metadata included in the batch (incoming objects). The process of determining whether there are conflicts is explained in more detail below. In general, system B uses the object path name (/object1 in this case) to determine whether the object exists, whether there is a conflict, and what operation to perform after a conflict is determined.

The process of determining whether there is a conflict involves determining an object that is a "winner" and an object that is a "loser." The winner object is an object that system B has determined to be the object to be used (between the existing object and the incoming object) by a storage system (and subsequently made visible) for a given object path in the namespace. The winner can be identified in a variety of different manners. In one or more embodiments, the winner is identified by having the most recent change time. Alternatively, different criteria can be used in combination to determine the outcome of the collision.

The metadata manager sets a flag in the loser object's metadata indicating the collision so the data content of the loser object is able to be distinguished from the winner object within the namespace. In addition, the loser object is moved or modified within the namespace (e.g., given a new path name) according to the namespace 1 configurations.

At step 612, system B stores the winning object's metadata in the local database and makes the object visible to client 2. When system B makes /object1 visible to client 2, client 2 is able to read the data contents associated with the metadata on system B although the data contents for /object1 are not yet transferred (and thus not yet stored locally) by using the read from replica system described above. Client 2 is unaware that the associated data contents are not stored locally. From client 2's perspective, it is as if the data contents are stored locally.

At step 614, system B, uses the replication software to develop instructions for system A, based on the namespace 1 configuration settings and the service plan of system B. In general, the instructions are formed by the target storage system (system B in this case) to inform the source system (storage system A in this case) if and what data system B needs from system A to complete the replication. At step 616, the instructions are sent to system A along with an acknowledgement message indicating that system B successfully received the batched metadata, which is now stored (winning and losing objects).

At steps 618 and 620, respectively, system A receives the ACK message with the instructions and then evaluates the instructions. Upon evaluation, system A determines what data to send to system B, which may include the associated data content and/or associated custom metadata. At step 620, if necessary according to the instructions, associated data content is batched from the data indicated in the change time window for the data and sent to system B. As mentioned above, the replication service builds a data batch using the metadata manager. System B receives and stores the batched data according to the objects in its local database at steps 624 and 626, respectively. Then, system B sends an acknowledgement message and system A receives the acknowledgement message indicating the data is received and committed to disk accordingly (in steps 628 and 630, respectively). Accordingly, for each batch of metadata the above processing is performed to ensure replication across multiple storage systems, which reduces conflicts between incoming and existing objects on the same namespace. If a fatal error occurred and the connection has been broken or closed, then system A does not receive an ACK message from system B that it successfully received the metadata batch or system A does not receive an ACK message from system B that it successfully received the data content batch. In this case, the closed connection is detected and the operation is retried until an ACK is received.

Figure 7:
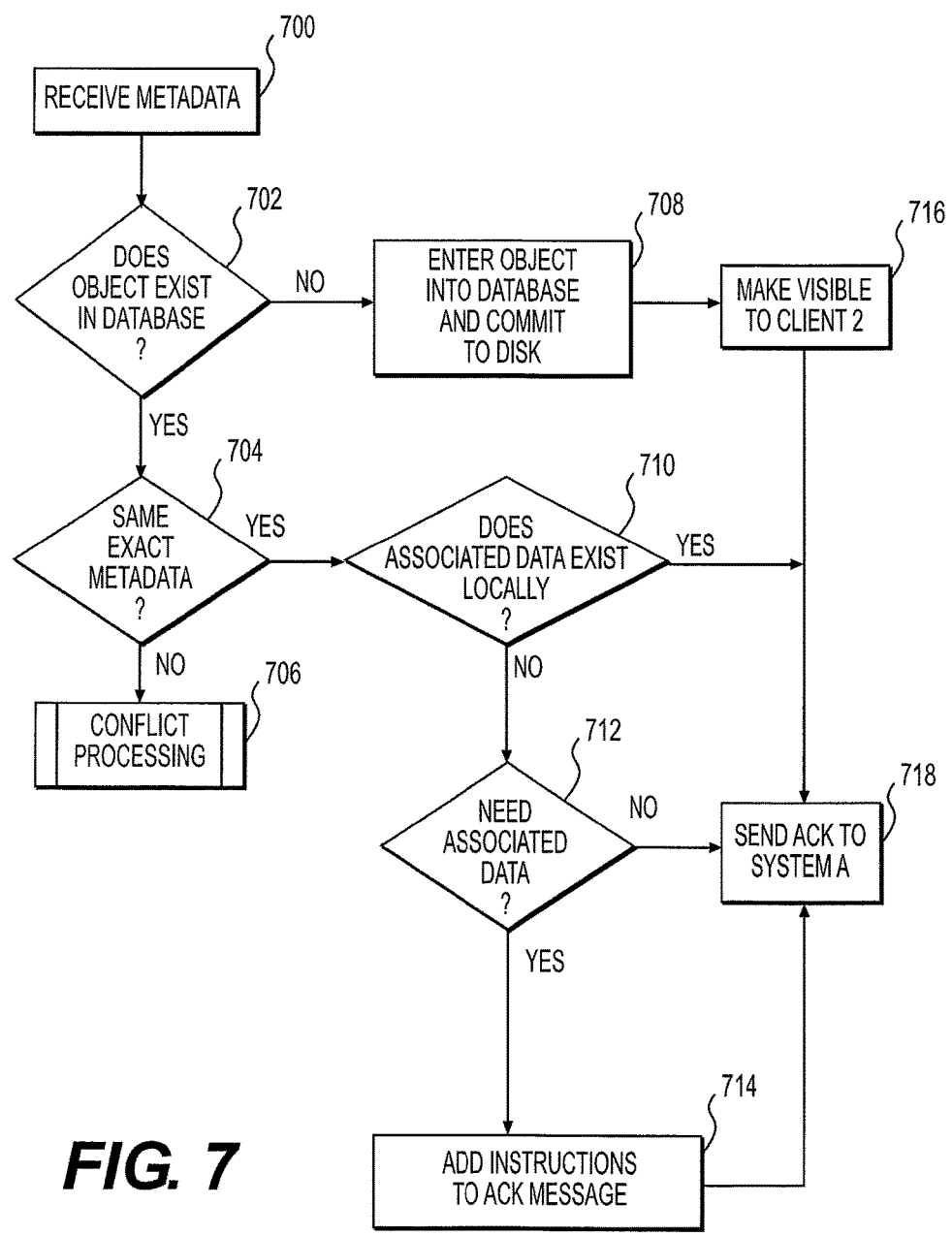
FIG. 7 is a flowchart illustrating the operations performed by a storage system when receiving a metadata batch according to an embodiment of the present invention.

FIG. 7 is a flowchart illustrating the operations performed by a storage system when receiving a metadata batch. At step 700, system B receives a metadata batch from system A for metadata replication and for each object's metadata included in the batch, the replication service of system B performs the following processing. At step 702, the metadata manager searches its local database to determine if the object exists. The metadata manager queries the database for the object path, which is a part of the metadata of all objects. In other words, the pathname of the object is known from the object's metadata. By way of example, the search is executed using the query "/object1." If the object exists, the metadata manager pulls the metadata of the object and stores it in cache memory.

If the object does not exist in system B (no at step 702), the object's metadata is entered into the database and committed to disk in system B (step 708). The object is then immediately made visible to client 2 of system B (step 716). Subsequently, system B sends an acknowledgment message to system A, which may include instructions for sending the associated content data based on the service plan of system B. If the object exists in system B (yes at step 702), the existing metadata (pulled into cache) and the incoming metadata is compared to determine whether the exact same metadata exists, at step 704. A comparison between each part (e.g., version ID, change time etc.) of the metadata is compared. Those having ordinary skill in the art understand that only relevant parts of the metadata are compared to make this determination. For example, the custom metadata is not compared and the pointer to the location of the data contents in the cluster is not compared (included in the metadata). The version ID and change time are examples of metadata compared and is not inclusive of all the parts of metadata compared or limiting. The storage system may determine that only certain parts of the metadata are to be compared.

If the metadata is the same then processing proceeds to step 710. If, in step 704, the compared parts of the metadata are not the same, then the processing proceeds to step 706, which includes further conflict processing (described in FIG. 8).

At step 710, system B evaluates whether the associated data content is stored locally on disk. In one embodiment, the metadata in the metadata manager database indicates whether the object contains data, metadata only, or both. Accordingly, to determine whether the data is stored locally, the metadata is evaluated to make the determination. If the data is stored on system B, then an acknowledgment message is sent to system A. If the determination is no at step 710, step 712 evaluates the service plan for system B to determine whether instructions for system A to send the associated data or associated custom metadata for/object1 should be sent with the acknowledgment. If the data should be sent to system B, then system B formulates instructions directing system B to do so (in step 714). Subsequently, an acknowledgment message is sent to system A with the instructions.

Figure 8:
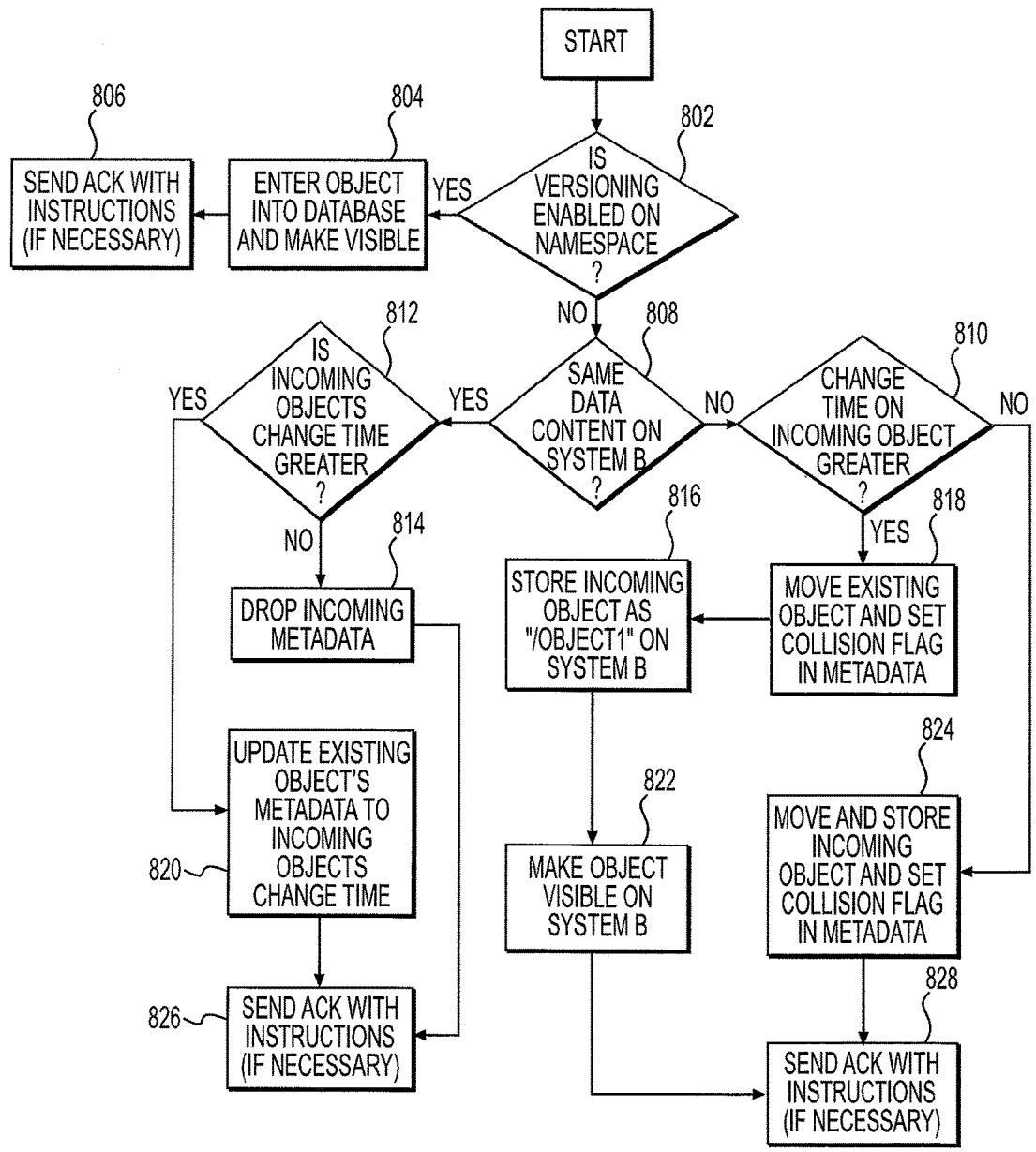
FIG. 8 is a flowchart illustrating the operations performed by a storage system after receiving a metadata batch to determine conflicts between existing and incoming data objects according to an embodiment of the present invention.

FIG. 8 is a flowchart illustrating further conflict processing operations performed by the replication service software of a storage system after receiving a metadata batch to determine conflicts between existing and incoming data objects. System B makes an initial inquiry to the namespace configuration settings (of namespace1) to determine whether versioning is enabled for this namespace. If versioning is enabled for a namespace, then conflicts between incoming objects and existing objects are not possible, rather another version of the object is stored. In the case that versioning is enabled for the namespace 1 (yes at step 802), at step 804, the object is entered into the database, committed to disk, and made visible to client 2 (of system B). Then, an acknowledgement is sent to system A with instructions (by referring to the service plan as discussed above), if necessary (step 806).

If versioning is not enabled, system B determines whether the same object (e.g., /object1) was written to system B with the same data content prior to metadata replication from system A (step 808). In the case that the same object was written prior to data replication with the same data content (yes in step 808), the change time of the incoming and existing object's metadata is evaluated to determine which change time is greater (more recent in time). If the existing object's change time (included in metadata) is more recent, then the incoming object's metadata is removed (step 814). Subsequently, at step 826, system B sends an acknowledgment message to system A with instructions, if necessary. If, however, the incoming object's metadata is more recent, then the existing object's metadata is updated according to the incoming metadata's change time (step 820). The existing object's metadata is of course already stored in the database. Following step 820, system B sends an acknowledgment message to system A with instructions, if necessary (step 826).

According to the evaluation at step 808, if an object with the same object path (e.g., /object 1) was written prior to metadata replication but does not have the same data content stored (no in step 808), then at step 818 the change time of the incoming and existing object's metadata is compared to determine which change time is greater (more recent in time). If the change time of the incoming metadata is more recent, then processing proceeds to step 818. If not, then processing proceeds to step 824. At step 824, system B has determined that there is a collision and the incoming object is not the most recent representation of the /object1. Therefore, the metadata manager of system B sets the incoming object's metadata collision flag to 1 (true) thus identifying the incoming object as the loser of the collision.

The loser object is handled differently by the metadata manager and replication service software depending on the namespace configuration settings. In one case, the namespace is configured so that "losing" objects in a collision are moved to another directory (e.g., "lost and found" directory) in the namespace. In this case, the replication service generates the lost and found directory and changes the path name of/object1 to "/.lost+found/replication<linkId>/object1.collission" thereby moving the incoming object to the directory. Of course, the directory may have a different name and the above name is not a limitation. The metadata manager checks the namespace configuration and determines that the object should be moved to the directory and moves the object according to the above.

In another case, the namespace configuration may be set so that the object path is appended with ".collision." In this case, the metadata manger moves the loser by changing the object path to "/object1.collission." Accordingly, the metadata manager checks the namespace configuration and determines that "collision" should be appended to the object to thereby change the object path (move) the object. Of course the appendage does not have to be "collision" and may be another identifier which separates and identifies the pathname of the winner object from the pathname of the loser object. In either case, the losing objects are saved so that an administrator or client may view them to manually make decisions regarding the object (e.g., remove, retain, or promote a loser object to winner object) at a subsequent time. As a result of the collision flag being set to 1 (true) for the loser objects, the metadata manager may query its database to return a list of all loser objects by identifying the objects which have collision set as 1 (true), whether or not the loser object is stored in the lost and found directory ("/.lost+found/replicationRlinkId>/object1.collision") or appended with ".collision." The above two cases are merely examples of how a storage system handles the loser object in a collision and are not meant to be limitations.

Further, at step 824, the existing object remains the winner and remains the object which is visible to client 2. Then processing continues to step 828 to send an acknowledgment message to system A, with instructions as necessary.

In step 810, if the change time on the incoming object is greater (the most recent), then, at step 818, the existing object (e.g., "/object1" stored on system B in namespace 1) is determined to be the loser and the collision flag is set to 1 (true) thus identifying the existing object as the loser. Further, the path name is changed by the metadata manager in accordance with the namespace configuration (as described above). The incoming metadata is inserted into the database by the metadata manager and committed to disk as the /object1 object on system B at step 816. The incoming object is then made visible using the incoming metadata (at step 822). Once inserted into the database, the metadata for the incoming object is referred to for read requests to access the data content of /object1. Subsequently, an acknowledgment message is sent to system A, including instructions, if necessary (at step 826).

Figure 9:
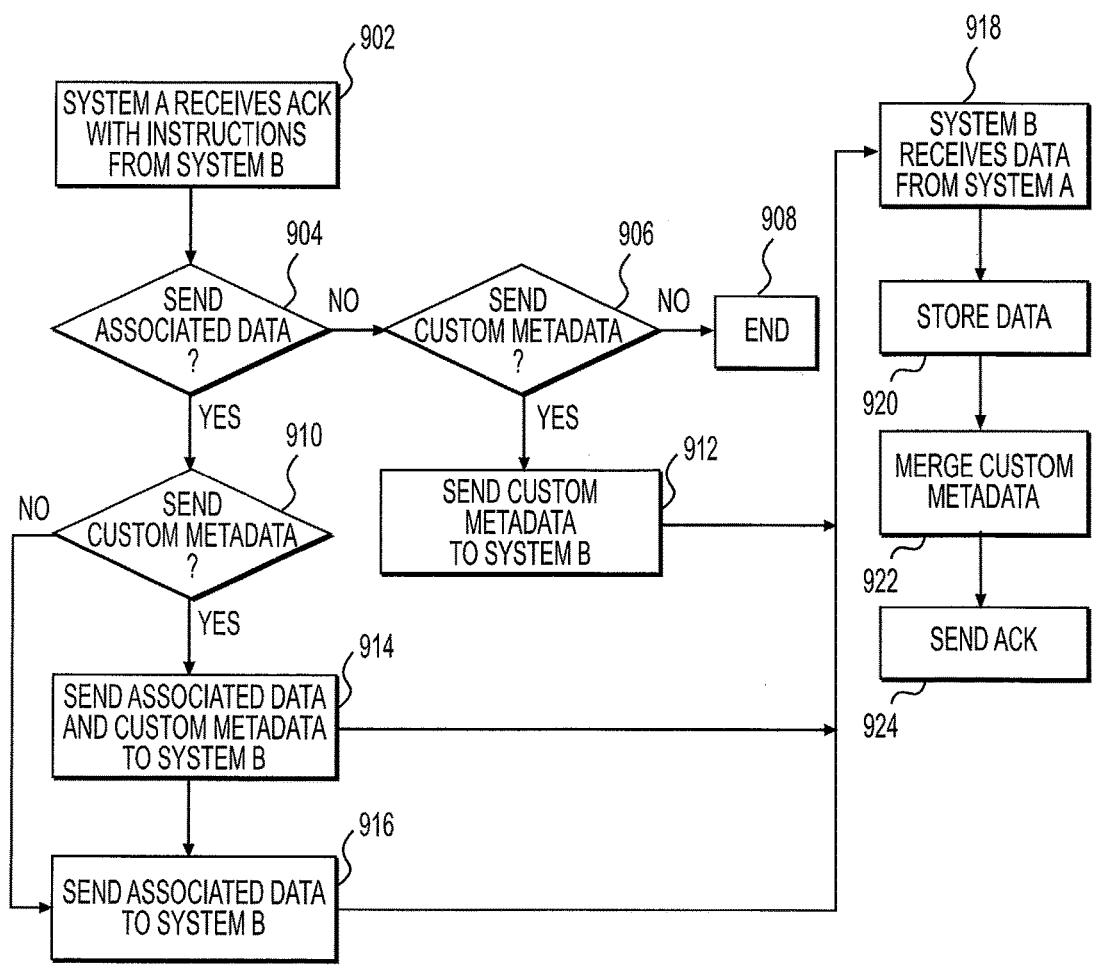
FIG. 9 is a flowchart illustrating the operations performed on a storage system during synchronization of data content and custom metadata according to an embodiment of the present invention.

FIG. 9 is a flowchart illustrating the operations performed on a storage system during synchronization of data content and custom metadata according to one embodiment of the present invention. In some embodiments, the acknowledgment message sent to system B includes custom metadata stored on system B (if any) for the existing object. This operation further ensures consistency between the replicas stored on other systems. Referring to FIG. 6, at step 620, when system A evaluates the instructions, the custom data sent is compared with the custom data system A already has for the object. On system A, the custom metadata is merged. If for example, system A had pieces of custom metadata for/object1 indicating a patients name and age and system B had pieces of custom metadata indicating a note about the patient, then on system A, the pieces of metadata would be merged to include the note. If there's a conflict when merging the custom metadata, the data with the most recent change is kept and stored, while the other is removed.

At step 902, system A receives an acknowledgement with instructions from system B. It is noted that step 902 corresponds to step 618 of FIG. 6. System A evaluates the instructions and determines, from the instructions, whether to send the associated data content for the object(s) corresponding to the acknowledgment it received. As mentioned above, system B develops instructions of whether to instruct system A to send the associated data content based on evaluating its service plan which, in part, may be set to store metadata only or metadata and data content for the object. In some embodiments, if system B determines that the associated data content does not need to be transferred from system A, system B will not include instructions directing system A to send the data. System A, upon not finding instructions, will not send the data content.

Accordingly, in step 904, system A evaluates whether to send the data content. If data content is not to be sent (no in step 904), then the system evaluates whether it has any custom metadata for /object1 to send to system B (step 906). If yes, then the custom metadata is sent to system B. If the determination is no, then system A does not send the associated data or custom metadata. The determination of whether to send custom metadata may depend on whether there is additional custom metadata stored on system A for the object that system B does not have and/or determining which system stores the latest custom metadata if there are any custom metadata conflicts.

If, in step 904, system A is instructed to send associated data content, the metadata manager queries the change time window for the data and the replication service uses a background collection process to batch the data. The batching of data is similar to the batching of metadata, described above. System A then needs to determine whether to also send custom metadata (step 910). The operations to determine whether to send custom metadata are the same operations described above with respect to step 906. In step 914, the data content batch and the custom metadata are sent to system B. In step 916, based on the decision in step 910, the data content batch alone is sent to system B.

At this point, system B receives the associate data content batch from system A and the custom metadata (if sent) (step 918). At step 920, the metadata manager of system B commits the data to disk appropriately. At step 922, system B merges the custom metadata received for each object and sends an acknowledgment acknowledging successful reception of the data content batch (step 924). In addition, the service plan of system B sets retention times for objects and objects in the same namespace may be retained longer on different storage systems. Upon merging, the retention times of each object (incoming or existing) are compared to determine which has the longer retention period. The longest retention period between the objects is kept and used for the winning object. For example, if the service plan of system A states that /object1 has a retention time of 15 years and system B has a retention time of 10 years and system B's /object1 is the winner, system A's /object1 will be the loser, but the retention time of 15 years will be applied to system B's /object1.

If system B has custom metadata that system A does not have, then it will be included in the acknowledgment message of step 924 to be evaluated by system A.

In another embodiment, the metadata batch sent at step 606 in FIG. 6 includes the custom metadata for the object being replicated and system B performs the merging and custom metadata comparisons, as described above in a similar manner. In this embodiment, system A, at step 618, would evaluate the instructions to merge the custom metadata sent (if any) from system B.

Figure 10:
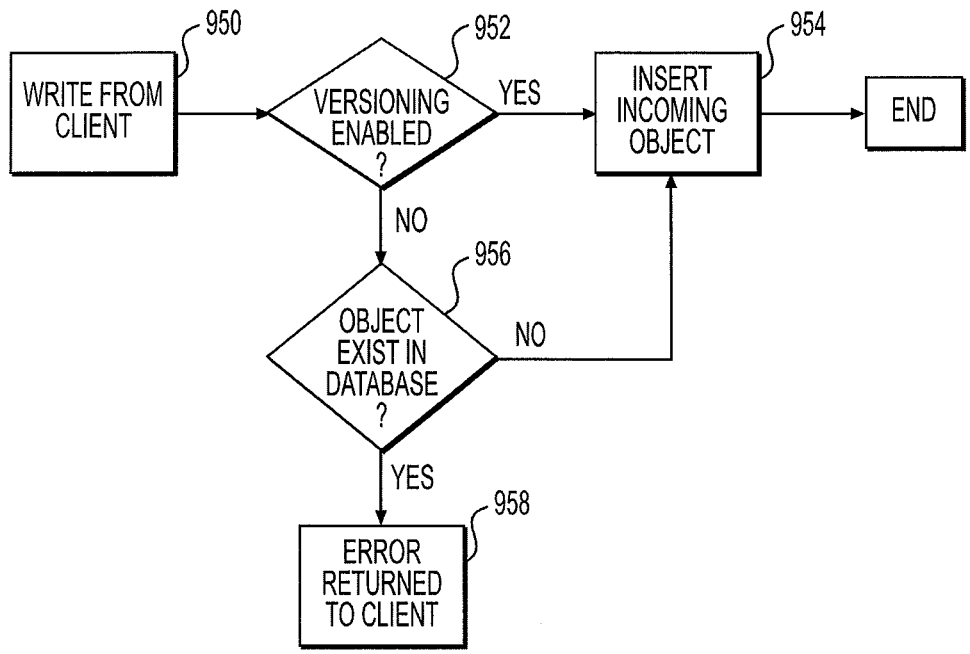
FIG. 10 is a flowchart illustrating the operations performed by a storage system when a write request is received by a client (application) for an object path that already exists in the storage system according to an embodiment of the present invention.

FIG. 10 is a flowchart illustrating the operations performed by a storage system when a write request is received by a client (application) for an object path that already exists in the storage system. At step 952, the metadata manager evaluates whether the namespace that holds the object of the write request has versioning enabled. If versioning is enabled, the object is inserted into the database (with a different version ID), committed to disk, and made visible to the client. If versioning is not enabled, at step 956, the metadata manager queries its database for the object path to determine if the object exists. If the object exists, an error is returned to the client instead of a message indicating a successful write. At step 958 there is no opportunity for collision processing. According to this operation, the client becomes immediately aware that the object already exists.

If, the object does not exist in the database (no in step 956), then the object is inserted into the database, committed to disk, and made visible to the client. It is important to note that when the metadata manager queries its database for the object, it will return that the object exists even if only the metadata for the object is stored. For example, in the case that a write request is received from a client to storage system B after step 612 of FIG. 6, which makes the winner object visible, system B will return an error the client2. In this regard, the batched transfer of metadata minimizes the possibility of object collisions by "reserving" the objet name on system B. In step 956, once metadata is stored for an object on a storage system and the storage system receives a write request for the same object, conflict processing is unnecessary because the client will receive an error message immediately.

Figure 11:
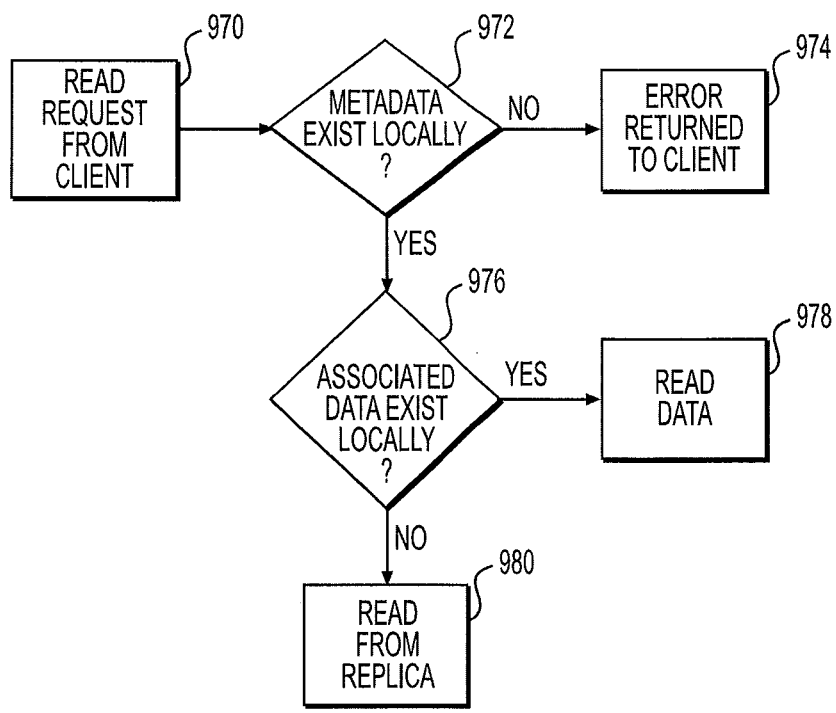
FIG. 11 is a flowchart illustrating the operations performed on a storage system when a read request is received from a client according to an embodiment of the present invention.

FIG. 11 is a flowchart illustrating the operations performed on a storage system when a read request is received from a client. At step 972, the metadata manager evaluates its database to determine whether the object exists (by searching for the object path as mentioned above). If it exists, the next determination made is whether the data content associated with the metadata is stored locally (step 976). In addition, to determine if the data is stored locally, the metadata in the metadata manager database indicates whether the object contains data, metadata only, or both. Accordingly, the metadata can be evaluated to make the determination. If the data is stored locally, then the data is pulled and returned to the client (step 978). If the data is not stored locally, the data is returned to the client using the read from replica processing described above (step 980).

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

As used herein, the word "location" is not necessarily limited to a "geographic" location. While clusters and storage systems are typically separated geographically, this is not a requirement. A primary cluster may be located in one data center in a city, while the replica cluster is located in another data center in the same city.

What is claimed is:

1. A storage system, comprising:
a first storage system and a second storage system connected to a network,
wherein the first storage system includes a first central processing unit, a first memory, and a first storage device coupled to the first central processing unit and first memory, the first central processing unit is configured to manage a first namespace which contains data and metadata associated with the data, the data and associated metadata are stored in the first storage device,
wherein the second storage system includes a second central processing unit, a second memory, and a second storage device coupled to the second memory and the second processing unit, the second central processing unit is configured to manage the first namespace which contains data and metadata associated with the data, the data and associated metadata are stored in the second storage device,
wherein the first storage system is configured to:
receive a write request of first data,
store the first data and first metadata associated with the first data in the first storage device within the first namespace managed by the first central processing unit,
transfer the first metadata to the second storage system, and
wherein the second storage system is configured to:
receive the first metadata transferred from the first storage system,
determine whether there is a collision among the transferred first metadata and at least one second metadata of a plurality of second metadata previously stored in the second storage device within the first namespace, based on whether a first portion of the first metadata and a respectively corresponding first portion of the at least one second metadata are the same,
upon determining that there is no collision among the transferred first metadata and the plurality of second metadata, allow access to the first data associated with the transferred first metadata via the second storage system by a client of the second storage system without receiving the first data associated with the first metadata, and wherein upon determining that there is a collision among the transferred first metadata and the at least one second metadata, allow access to the first data associated with the transferred first metadata via the second storage system by the client of the second storage system without receiving the first data associated with the first metadata upon determining that (1) second data associated with the at least one second metadata is not the same as the first data associated with the first metadata and upon determining that (2) an update time of the transferred first metadata is more recent than a corresponding update time of the at least one second metadata.

2. The storage system according to claim 1, wherein
the second storage system is configured to: upon determining that there is a collision and upon determining that at least another portion of the first metadata and at least one second metadata are not the same, the second data and the first data are the same, and the update time of the first metadata is more recent than the corresponding update time of the at least one second metadata, update the update time of the at least one second metadata to that of the update time of the first metadata.

3. The storage system of claim 1, wherein
the first storage system and the second storage system are connected using a replication link over the network,
the metadata and data are transferred in batches using the replication link, and
the metadata includes custom metadata and system metadata.

4. The storage system of claim 1, wherein
the first portion of the first metadata and the respectively corresponding first portions of the previously stored second metadata are path names.

5. The storage system of claim 1, wherein
the second storage system is configured to:
upon determining that there is a collision and upon determining at least another portion of the first metadata and at least one second metadata are the same, send an acknowledgment message to the first storage system including instructions, and the instructions are generated based upon configuration settings of the second storage system.

6. A storage system, comprising:
a first storage system and a second storage system connected to a network,
wherein the first storage system includes a first central processing unit, a first memory, and a first storage device coupled to the first central processing unit and first memory, the first central processing unit is configured to manage a first namespace which contains data and metadata associated with the data, the data and associated metadata are stored in the first storage device,
wherein the second storage system includes a second central processing unit, a second memory, and a second storage device coupled to the second memory and the second processing unit, the second central processing unit is configured to manage the first namespace which contains data and metadata associated with the data, the data and associated metadata are stored in the second storage device, wherein the first storage system is configured to:
receive a write request of first data,
store the first data and first metadata associated with the first data in the first storage device within the first namespace managed by the first central processing unit,
transfer the first metadata to the second storage system, and
wherein the second storage system is configured to:
receive the first metadata transferred from the first storage system,
determine whether there is a collision among the transferred first metadata and at least one second metadata of a plurality of second metadata previously stored in the second storage device within the first namespace, based on whether a first portion of the first metadata and a respectively corresponding first portion of the at least one second metadata are the same, and
upon determining that there is no collision among the transferred first metadata and the plurality of second metadata, allow access to the first data associated with the transferred first metadata via the second storage system by a client of the second storage system without receiving the first data associated with the first metadata,
wherein the second storage system is configured to:
upon determining that there is a collision and upon determining that the second data associated with the at least one second metadata is not the same as the first data associated with the transferred first data, and the update time of the transferred first metadata is more recent than a corresponding update time of the at least one second metadata, the transferred first metadata is committed to the second storage system and referred to upon receiving a read request from the client to read the first data associated with the first metadata, and a flag indicating a collision is set in the at least one second metadata, and
upon determining there is a collision and upon determining that the update time of the at least one second metadata is more recent than a corresponding update time of the transferred first metadata, a flag indicating a collision is set in the transferred first metadata.

7. The storage system according to claim 1, wherein
the second storage system sends an acknowledgment message to the first storage system after the first metadata is stored in the second storage device within the first namespace, the acknowledgment message includes instructions for sending the first data associated with the first metadata, and the instructions are generated based upon configuration settings of the second storage system, and
upon receiving the acknowledgment message, the first storage system evaluates the instructions to determine whether to transfer the first data content.

8. A storage method for a storage system comprising a first storage system and a second storage system connected to a network,
the first storage system includes a first central processing unit, a first memory, and a first storage device coupled to the first memory and the first central processing unit, the first central processing unit is configured to manage a first namespace which contains data and metadata associated with the data, the first data and metadata associated with the data is stored in the first storage device;
the second storage system includes a second central processing unit, a second memory, and a second storage device coupled to the second memory and the second processing unit, the second processing unit is configured to manage the first namespace which contains data and metadata associated with the data, the data and metadata associated with the data is stored in the second storage device, the method comprising the steps of:

receiving, by the first storage system, a write request of first data;

storing the first data and first metadata associated with the first data in the first storage device within the first namespace managed by the first central processing unit;

transferring the first metadata to the second storage system;

receiving, by the second storage system, the first metadata transferred from the first storage system;

determining, by the second storage system, whether there is a collision among the transferred first metadata and at least one second metadata of a plurality of second metadata previously stored in the second storage device within the first namespace, based on whether a first portion of the first metadata and a respectively corresponding first portion of the at least one second metadata are the same upon determining that there is no collision among the transferred first metadata and the at least one second metadata, allowing access, by the second storage system, to the first data associated with the transferred first metadata via the second storage system by a client of the second storage system without receiving the first data associated with the first metadata; and upon determining that there is a collision among the transferred first metadata and the at least one second metadata, allow access, by the second storage system, to the first data associated with the transferred first metadata via the second storage system by the client of the second storage system without receiving the first data associated with the first metadata upon determining that (1) second data associated with the at least one second metadata is not the same as the first data associated with the first metadata and upon determining that (2) an update time of the transferred first metadata is more recent than a corresponding update time of the at least one second metadata.

9. The storage method according to claim 8, further comprising the steps of:

the second storage system is configured to: upon determining that there is a collision and upon determining that at least another portion of the first metadata and the at least one second metadata are not the same, the second data and the first data are the same, and the update time of the first metadata is more recent than the corresponding update time of the at least one second metadata, update the update time of the at least one second metadata to that of the update time of the first metadata.

10. The storage method according to claim 8, further comprising the steps of:

upon determining that there is a collision and upon determining that the update time of the at least one second metadata is more recent than a corresponding update time of the transferred first metadata, a flag indicating a collision is set in the transferred first metadata.

11. The storage method according to claim 8, wherein the second storage system sends an acknowledgment message to the first storage system after the first metadata is stored in the second storage device within the first namespace, the acknowledgment message includes instructions for sending the first data associated with the first metadata, and the instructions are generated based upon configuration settings of the second storage system, and upon receiving the acknowledgment message, the first storage system evaluates the instructions to determine whether to transfer the first data content.

12. The storage method according to claim 8, wherein the first storage system and the second storage system are connected using a replication link over the network, and the metadata and data are transferred in batches using the replication link.

13. The storage method according to claim 8, wherein the first portion of the first metadata and the respectively corresponding first portions of the previously stored second metadata are path names.

14. The storage system of claim 8, further comprising the steps of:

upon determining that there is a collision and upon determining at least another portion of the first metadata and at least one second metadata are the same, sending an acknowledgment message to the first storage system including instructions, and the instructions are generated based upon configuration settings of the second storage system.

* * * * *